(12) United States Patent
Zirnstein et al.

(10) Patent No.: US 6,579,846 B1
(45) Date of Patent: Jun. 17, 2003

(54) ACYLATED POLYMERIC POLYAMINES

(75) Inventors: Michael Zirnstein, Schriesheim (DE); Günter Oetter, Frankenthal (DE); Kristin Tiefensee, Westheim (DE); Knut Oppenländer, Ludwigshafen (DE); Jürgen Decker, Speyer (DE); Michael Ehle, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/474,827

(22) Filed: Dec. 30, 1999

(30) Foreign Application Priority Data

Jan. 8, 1999 (DE) .......................... 199 00 458

(51) Int. Cl.⁷ ................................. C11D 3/30
(52) U.S. Cl. ...................... 510/499; 510/470; 510/480; 510/130
(58) Field of Search ................ 510/470, 499, 510/480, 130

(56) References Cited

U.S. PATENT DOCUMENTS

| 3,862,310 | A |   | 1/1975 | Quasius ........................ 424/70 |
| 4,132,831 | A | * | 1/1979 | Dickert et al. .............. 428/458 |
| 4,540,747 | A | * | 9/1985 | Saegusa et al. ............. 525/410 |
| 5,002,974 | A |   | 3/1991 | Geria ......................... 514/782 |
| 5,043,250 | A | * | 8/1991 | West et al. .................. 430/278 |
| 5,786,308 | A | * | 7/1998 | Eicken et al. ............... 528/403 |

FOREIGN PATENT DOCUMENTS

| EP | 336 901 |   | 10/1989 |
| JP | 9 157 113 |   | 12/1995 |
| JP | 09157113 |   | 6/1997 |
| WO | 90/08175 | * | 7/1990 |

* cited by examiner

Primary Examiner—Charles Boyer
(74) Attorney, Agent, or Firm—Keil & Weinkauf

(57) ABSTRACT

The present invention relates to acylated polymeric polyamines, to processes for their preparation, to their use, and to aqueous compositions which comprise these polyamines.

7 Claims, No Drawings

ACYLATED POLYMERIC POLYAMINES

The present invention relates to acylated polymeric polyamines, to their use as thickeners, and to aqueous compositions which comprise these polyamines.

Thickeners are used widely to increase the viscosity of aqueous preparations, for example in the field of pharmacy and cosmetics. Examples of common thickeners are fatty acid polyethylene glycol monoesters, fatty acid polyethylene glycol diesters, fatty acid alkanolamides, ethoxylated fatty alcohols, ethoxylated glycerol fatty acid esters, cellulose ethers, sodium alginate, polyacrylic acids, and neutral salts.

The use of the known thickeners is, however, associated with disadvantages, depending on the preparation to be thickened. For example, it is possible that the thickening action and the salt stability of the thickener are unsatisfactory, that their use is undesired, and that their incorporation into the preparation to be thickened is hindered.

EP-A-0 336 901 describes a two-phase medicinal skin-care composition for increasing the moisture content of the skin. As a nonionic surface-active agent, this can have an acylated polyethyleneimine containing $C_{12}$- to $C_{18}$-acyl radicals.

FR-A-2 164 801 describes a polyethyleneimine which has been partially formylated with ethyl formate, and its use in cosmetic compositions.

JP-A-09 157 113 describes polyethyleneimines acylated with fatty acids and their use as bacteriostatics, e. g. in cosmetic formulations.

An object of the present invention is to provide a novel thickener. This should be suitable for aqueous formulations, preferably for cosmetic compositions. Preferably, it should be useful for surfactant-containing compositions, in particular for compositions which comprise an alkyl or alkenyl polyglycoside.

Surprisingly, we have found that this object is achieved by acylated polymeric polyamines in which some of the polyamine nitrogen atoms have at least one long-chain $C_8$- to $C_{28}$-acyl radical, and some of the other polyamine nitrogen atoms have at least one short-chain $C_1$- to $C_7$-acyl radical.

The present invention therefore relates to acylated polymeric polyamines, where a) some of the polyamine nitrogen atoms carry acyl radicals of the formula I

in which
$R^1$ is selected from $C_7$- to $C_{27}$-alkyl, $C_7$- to $C_{27}$-alkenyl and $C_7$- to $C_{27}$-hydroxyalkyl, and b) some of the polyamine nitrogen atoms carry acyl radicals of the formula II

in which
$R^2$ is selected from hydrogen, $C_1$- to $C_6$-alkyl and $C_1$- to $C_6$-hydroxyalkyl.

For the purposes of the present invention, the term $C_1$- to $C_6$-alkyl includes straight-chain and branched alkyl groups. These include, in particular, methyl, ethyl, n-propyl, isopropyl, n-butyl, 1-methylpropyl, 2-methylpropyl, 1,1-dimethylethyl, n-pentyl, 1-methylbutyl, 2-methylbutyl, 3-methylbutyl, n-hexyl. Preference is given to straight-chain and branched $C_1$- to $C_3$-alkyl groups.

$C_1$- to $C_6$-hydroxyalkyl is a $C_1$- to $C_6$-alkyl radical being substituted with 1 or 2 hydroxyl groups, e. g. 1-, 2- or 3-hydroxypropyl, 1-, 2-, 3- or 4-hydroxybutyl or 1-, 2-, 3-, 4- or 5-hydroxypentyl, especially 3-hydroxypropyl or 5-hydroxypentyl.

The term $C_7$- to $C_{27}$-alkyl includes straight-chain and branched alkyl groups. These are preferably straight-chain and branched $C_9$- to $C_{25}$-alkyl, particularly preferably $C_{10}$- to $C_{22}$-, and especially $C_{11}$- to $C_{19}$-alkyl groups. Preference is given in this connection to predominantly linear alkyl radicals, as also occur in natural or synthetic fatty acids and fatty alcohols, and also oxo alcohols. These include, in particular, n-octyl, ethylhexyl, 1,1,3,3-tetramethylbutyl, n-nonyl, n-decyl, n-undecyl, n-dodecyl, n-tridecyl, myristyl, pentadecyl, palmityl (=cetyl), heptadecyl, octadecyl, nonadecyl, arachidyl, behenyl, lignocerenyl, cerotinyl, melissinyl etc.

$C_7$- to $C_{27}$-alkenyl preferably stands for straight-chain and branched alkenyl groups which can be mono-, di- or poly-unsaturated. Preference is given to $C_9$- to $C_{25}$-, in particular $C_{10}$- to $C_{22}$-, and especially $C_{11}$- to $C_{19}$-alkenyl groups. These include, in particular, octenyl, nonenyl, decenyl, undecenyl, dodecenyl, tridecenyl, tetradecenyl, pentadecenyl, hexadecenyl, heptadecenyl, octadecenyl, nonadecenyl, linolyl, linolenyl, elaostearyl etc.

$C_1$- to $C_{27}$-hydroxyalkyl is derived from the before mentioned $C_1$- to $C_{27}$-alkyl radicals which contain one, two, three or four, especially one or two hydroxyl groups; e. g. 10-hydroxydecyl, 11-hydroxyheptadecyl, 8,9-bishydroxyheptadecyl and 3-hydroxyheptadecyl.

Preferably, the radicals $R^1$ and $R^2$ have a difference in the number of carbon atoms of at least 4, in particular at least 6 and especially at least 10.

Preferably, the radical $R^1$ is a $C_7$- to $C_{27}$-alkyl radical or a $C_7$- to $C_{27}$-alkenyl radical.

Preferably, the radical $R^2$ is hydrogen or a $C_1$- to $C_6$-alkyl radical.

Especially, the radical $R^1$ is an alkyl radical derived formally from capric acid, lauric acid, myristic acid, palmitic acid, stearic acid, isostearic acid, oleic acid, linoleic acid, arachidonic acid, erucic acid, behenic acid, and mixtures thereof, by removal of the carboxylic acid group.

Especially, the radical $R^2$ is hydrogen, methyl, ethyl, n-propyl, and mixtures thereof.

Preferably, from about 0.3 to 40%, preferably from 0.6 to 25%, in particular from 1 to 15%, of the polyamine nitrogen atoms have an acyl radical of the formula I. Specifically, at least 1.5%, more specifically at least 2.5%, of the polyamine nitrogen atoms have an acyl radical of the formula I. The percentages refer in this case to the nitrogen atoms of the polyamine overall, i.e. to the total of primary, secondary and, if present, tertiary amine nitrogens.

Preferably, from about 5 to 100%, more preferably from 15 to 90%, in particular from 30 to 85%, specifically from 40 to 80%, of the polyamine nitrogens have been acylated. The degree of acylation refers in this case to the sum of acyl radicals of the formulae I and II.

The acylated polymeric polyamines according to the invention are obtainable by reaction of at least one polyamine, preferably at least one polyalkylenepolyamine, in particular at least one polyethyleneimine, with at least one long-chain carboxylic acid or a derivative thereof, and at least one short-chain carboxylic acid or a derivative thereof.

The invention further relates to a process for the preparation of acylated polymeric polyamines as defined above, where a polymeric polyamine is reacted with a) at least one carboxylic acid of the formula I.1

$$R^1\text{—COOH} \tag{I.1}$$

in which
R$^1$ is selected from C$_7$- to C$_{27}$-alkyl, C$_7$- to C$_{27}$-alkenyl and C$_7$- to C$_{27}$-hydroxyalkyl,
or an ester, anhydride or halide thereof, and b) at least one carboxylic acid of the formula II.1

$$R^2\text{—COOH} \tag{II.1}$$

in which
R$^2$ is selected from hydrogen, C$_1$- to C$_6$-alkyl and C$_1$- to C$_6$-hydroxyalkyl,
or an ester, anhydride, lactone or halide thereof.

Suitable polymeric polyamines are linear or branched polymers, preferably branched polymers. These preferably have acylatable secondary amino groups in the polymer chain. Additionally, these polymers can have terminal, primary amino groups and/or tertiary amino groups in the polymer chain.

According to a suitable embodiment, the amidatable polyalkylenepolyamines can have a strictly linear or essentially linear construction. Such polymers then exclusively or essentially have primary and secondary amino groups. Preference is given to using polyalkylenepolyamines which are branched. Here, the polyamine nitrogen atoms include not only primary and secondary, but also tertiary amino groups. The latter are not accessible to a reaction in an amidation reaction. Preference is given to using a polyalkylenepolyamine having a weight-average molecular weight of from about 500 to 1,000,000, preferably from about 1000 to 800,000, more preferably from 1500 to 200,000, in particular from 2000 to 50,000. Preferred polyalkylenepolyamines are, for example, polyethyleneimines.

Suitable polyethyleneimines are obtainable by customary processes known to the person skilled in the art and are sold commercially. Suitable polyethyleneimines are all polymers which are obtainable by cationically initiated polymerization of ethyleneimine (aziridine) and/or N-substituted aziridines. They are preferably homopolymers of ethyleneimine. Catalysts which can be used for the cationic polymerization of ethyleneimines are, for example, Brønsted acids, such as sulfuric acid, phosphoric acid, p-toluenesulfonic acid, or carboxylic acids, such as formic acid, acetic acid or propionic acid, or Lewis acids, such as halides, for example zinc chloride or alkyl halides, such as methyl chloride, ethyl chloride, benzyl chloride or ethylene chloride. Suitable polyethyleneimines can also be obtained by reaction of ethylene chloride with ammonia and amines. Polymers of this type are commercial products. The content of tertiary amino groups is, in the case of the branched polyalkylenepolyamines, for example from 0.5 to 40 mol %, such as from about 10 to 35 mol %, based on the total amount of the polyamine nitrogen atoms. In the reaction of the polyalkylenepolyamines with the abovementioned carboxylic acids, in some circumstances it is also possible to react an insignificant proportion of the polyamine nitrogen atoms, with salt formation. Optionally, salts are obtained, for example, in the reaction of tertiary amino groups with carboxylic acids. As a result, the use of the polymeric polyamines according to the invention as thickeners is generally not impaired.

The carboxylic acids of formula I.1 can be reacted either as pure compounds or as mixtures in the preparation of the acylated polymeric polyamines of the invention.

Preferably, in the formula I.1, the radical R$^1$ is one of the abovementioned C$_7$- to C$_{27}$-alkyl or alkenyl radicals.

Preference is given to the carboxylic acid of the formula I.1 chosen from capric acid, lauric acid, myristic acid, palmitic acid, stearic acid, isostearic acid, oleic acid, linoleic acid, arachidonic acid, erucic acid, behenic acid, and mixtures thereof.

Preference is given to using a mixture of naturally occurring carboxylic acids of the formula I.1, such as, for example, coconut fat, which essentially comprises lauric and myristic acid, tallow fat, which comprises predominantly saturated and unsaturated C$_{14}$-, C$_{16}$- and C$_{18}$-carboxylic acids, soy oil, linseed oil, rapeseed oil, fish oil etc. The long-chain carboxylic acids are preferably C$_{12}$- to C$_{18}$-carboxylic acids and mixtures thereof.

Preferred hydroxycarboxylic acids I.1 (compounds of formula I.1, where R$^1$ is C$_7$- to C$_{27}$-hydroxyalkyl) are 12-hydroxystearic acid, 9,10-bishydroxystearic acid and 11-hydroxyundecanoic acid.

If mixtures of long-chain carboxylic acids are used, then, if desired, it is possible for these to comprise, for example, from about 0 to 10% by weight, of short-chain carboxylic acids. In some circumstances, carboxylic acid mixtures of a natural origin in particular comprise a content of short-chain carboxylic acids.

The carboxylic acid of the formula II.1 is preferably formic acid, acetic acid, propionic acid, butyric acid, or a mixture thereof. The carboxylic acid of the formula II.1 is in particular formic acid and/or acetic acid.

Examples of hydroxycarboxylic acids (compounds of formula II.1, where R$^2$ is C$_1$- to C$_6$-hydroxyalkyl) are 4-hydroxybutyric acid and 6-hydroxyhexanoic acid.

The acylated polymeric polyamines according to the invention are prepared by methods known per se, for example by reaction of the abovementioned polyalkylenepolyamines with at least one long-chain carboxylic acid or a derivative thereof and with at least one short-chain carboxylic acid or a derivative thereof (amidation).

The polyamine can, if desired, be reacted firstly with the long-chain carboxylic acid(s) and then with the short-chain carboxylic acid(s), or firstly with the short-chain carboxylic acid(s), or simultaneously with a mixture thereof. Preference is given to reacting the polyamine in a first reaction step with at least one long-chain carboxylic acid and then in a second reaction step with at least one short-chain carboxylic acid. The starting materials are used in the first reaction step in a molar ratio such that, based on the total nitrogen content of the polyamine (including any tertiary amino groups which may be present), from 0.3 to 40 mol %, preferably from 0.6 to 25 mol %, in particular from 1 to 15 mol %, of the polyamine nitrogens are acylated and have an acyl radical of the formula I. The resulting, partially acylated polymeric polyamines can, if desired, be isolated by customary methods and optionally purified prior to their further reaction. The second reaction step is preferably carried out in the same reaction vessel as the first. In the second reaction step, the partially acylated polyamine and at least one short-chain carboxylated acid are used in a molar ratio such that, based on the total nitrogen content of the polyamine (including any tertiary amino groups which may be present), from 5 to 100%, preferably from 15 to 90%, in particular from 30 to 85%, especially from 40 to 80%, of the polyamine nitrogens are acylated.

The amidation can be carried out under customary conditions without the addition of a catalyst or using an acidic or basic catalyst. Suitable acidic catalysts are, for example, acids, such as Lewis acids, e. g. sulfuric acid, p toluenesulfonic acid, phosphorous acid, hypophosphorous acid, phosphoric acid, methanesulfonic acid, boric acid, aluminum chloride, boron trifluoride, tetraethyl orthotitanate, tin dioxide, tin butyldilaurate or mixtures thereof. Suitable basic catalysts are, for example, alkoxides, such as sodium methoxide or sodium methoxide, alkali metal hydroxides, such as potassium hydroxide, sodium hydroxide or lithium hydroxide, alkaline earth metal oxides, such as magnesium oxide or calcium oxide, alkali metal and alkaline earth metal carbonates, such as sodium, potassium and calcium carbonate, phosphates, such as potassium phosphate, and complex metal hydrides, such as sodium borohydride.

If an additional catalyst is used, then it is generally in amounts of from 0.05 to 10% by weight, preferably from 0.1 to 5% by weight, based on the total amount of the starting materials.

The reaction can be carried out in a suitable solvent or, preferably, without solvent. If a solvent is used, suitable examples are hydrocarbons, such as toluene or xylene, acetonitrile, N, N-dimethylformamide, N, N-dimethylacetamide, N-methylpyrrolidone, diethylene glycol dimethyl ether, ethylene glycol dimethyl ether, ethylene carbonate, propylene carbonate, etc. In general, the solvent is distilled off during the reaction or after the reaction is complete. This distillation can optionally be carried out under protective gas, such as nitrogen or argon.

When a carboxylic acid is used, the amidation is generally carried out at a pressure in the range from 5 mbar to atmospheric pressure and at a temperature in the range from 60 to 220° C., preferably from 120 to 180 20 C. If a carboxylic ester is used, the amidation is generally carried out at from 30 to 220° C., preferably at from 50 to 120° C., and at a pressure in the range from 5 mbar to atmospheric pressure. The reaction times are generally in the range from 1 to 15 hours. The degree of conversion can be monitored via the amount of removed water of reaction or reaction alcohol. Unreacted carboxylic acid is generally removed in the customary manner when the reaction is complete, for example under reduced pressure, by extraction or stripping.

Alternatively, the acylated polymeric polyamines according to the invention can also be obtained by reaction of at least one polyamine with at least one suitable carboxylic acid derivative, such as a carbonyl halide, e. g. a carbonyl chloride, a carboxylic anhydride, a mixed carboxylic anhydride or in case of hydroxycarboxylic acid II.1 a lactone.

The abovementioned process according to the invention gives products in which about 10 to 100%, e. g. from about 20 to 95% of the theoretically acylatable (i. e. of the primary and secondary) amino groups have been acylated. Primary amino groups are in this case only generally monoacylated. Here, the maximum degree of acylation which can be achieved in practice can be equal to or less than the maximum degree of acylation which can be achieved theoretically. In general, the maximum degree of acylation which can be achieved in practice is from about 70 to 100% of the maximum degree of acylation which can be achieved in theory. Products with very good thickening properties are generally obtained both for the maximum degree of acylation which can be achieved in practice and below it. To prepare products having an essentially maximum practical degree of acylation, the procedure may involve using at least one of the carboxylic acids, preferably at least one short-chain carboxylic acid, in an excess compared with the amidatable amino groups. Unreacted carboxylic acid can be removed as described above when the reaction is complete.

In a specific embodiment for the preparation of acylated polymeric polyamines, the polyamine can firstly be reacted with a long-chain carboxylic acid to give a partially acylated polyamine, which can then be further reacted with a short-chain carboxylic acid, where the molar ratio of short-chain carboxylic acid to acylatable amino groups of the partially acylated polyamine is chosen such that the short-chain carboxylic acid is used in excess. Finally, unreacted carboxylic acid is removed.

The process for the preparation of acylated polymeric polyamines according to the invention and described above leads to products in which the amino groups are essentially acylated and not converted into salts. A small content of salt groups is unimportant for use of the acylated polyamines as thickeners.

Acylated polymeric polyamines according to the invention can also be obtained by ring-opening polymerization of a monomer mixture which comprises at least one 4,5-dihydrooxazol and/or 5,6-dihydro-4H-1,3-oxazine, in each case containing one of the above-described radicals $R^1$ in the 2-position, and at least one 4,5-dihydrooxazol and/or 5,6-dihydro-4H-1,3-oxazine, in each case containing one of the above-described radicals $R^2$ in the 2-position.

The invention therefore also relates to a process for the preparation of acylated polymeric polyamines where
  a) at least one 4,5-dihydroxy oxazole containing a radical $R^1$ in the 2-position and/or at least one 5,6-dihydro-4H-1,3-oxazine containing a radical $R^1$ in the 2-position, where
     $R^1$ is selected from $C_7$- to $C_{27}$-alkyl, $C_7$- to $C_{27}$-alkenyl and $C_7$- to $C_{27}$-hydroxyalkyl, and
  b) at least one 4,5-dihydrooxazole containing a radical $R^2$ in the 2-position and/or at least one 5,6-dihydro-4H-1,3-oxazine containing a radical $R^2$ in the 2-position, where
     $R^2$ is selected from hydrogen, $C_1$- to $C_6$-alkyl and $C_1$- to $C_6$-hydroxyalkyl,
and optionally at least one other comonomer are reacted in a cationic ring-opening polymerization.

The ring-opening polymerization of the 5,6-dihydro-4H-1,3-oxazines and/or 4,5-dihydrooxazoles substituted in the 2-position leads to strictly linear polyamines. The monomers are used in molar amounts such that from about 0.3 to 40%, preferably from 0.6 to 25%, in particular from 1 to 15%, of the polyamine nitrogen atoms have an acyl radical of the formula I. If 5,6-dihydro-4H-1,3-oxazines or 4,5-dihydrooxazoles substituted in the 2-position by radicals $R^1$ and $R^2$ are used exclusively, then acylated polymeric polyamines are obtained which are completely acylated. If desired, these can then be subjected to partial hydrolysis by known processes. For example, even in the preparation of the polyamines according to the invention by cationic polymerization, products can be obtained in which from 5 to 100%, preferably from 15 to 90%, in particular from 30 to 85%, of the polyamine nitrogen atoms have been acylated.

The preparation of the acylated polymeric polyamines according to the invention by cationic ring-opening polymerization is carried out by customary processes known to the person skilled in the art.

Suitable initiators for the cationic polymerization are, for example, Brønsted acids, such as perchloric acid and trifluoromethanesulfonic acid, Lewis acids, such as boron trifluoride, aluminum trifluoride, optionally additionally with water or hydrogen chloride, and combinations of alkyl and aralkyl halides with Lewis acids.

The invention also relates to the above-described ethylated polymeric polyamines as thickeners, preferably in aqueous formulations, and in particular in cosmetic compositions.

The present invention also relates to aqueous compositions which comprise at least one acylated polymeric polyamine as defined above. These compositions preferably additionally comprise at least one surfactant.

If the surfactant used is an alkyl or alkenyl polyglycoside, then it is preferably a $C_8$–$C_{18}$-, $C_8$–$C_{16}$-, $C_{12}$–$C_{18}$-, $C_{12}$–$C_{16}$- or $C_{12}$–$C_{14}$-alkyl and/or alkenyl polyglycoside.

The invention further relates to aqueous compositions which comprise:
 a) at least one alkyl or alkenyl polyglycoside,
 b) at least one acylated polymeric polyamine, as defined above,
 c) optionally at least one other surfactant different from a), and
 d) optionally at least one neutral salt.

The polyglycosides are preferably polyglucosides, which are a homologue mixture obtained by acetalation of glucose with fatty alcohols. The mean number of glucose units per molecule is in the range from 1 to 3.

The acylated polymeric polyamine is generally present in the compositions in an amount of from at least 0.1% by weight to 20% by weight, preferably in an amount of from 0.5 to 20% by weight, based on the total weight of the composition.

The surfactant which may be present in the compositions according to the invention are anionic, nonionic, cationic and amphoteric surfactants. It has been found that the acylated polymeric polyamines are also compatible with anionic surfactants.

Examples of surfactants are alkyl polyglycosides, fatty alcohol sulfates, fatty alcohol sulfonates, fatty alcohol ether sulfates, fatty alcohol ether sulfonate, alkanesulfonates, fatty alcohol ethoxylates, fatty alcohol phosphates, alkylbetaines, sorbitan esters, POE-sorbitan esters, sugar fatty acid esters, fatty acid polyglycerol esters, fatty acid partial glycerides, fatty acid carboxylates, fatty alcohol sulfosuccinates, fatty acid sarcosinates, fatty acid isothionates, fatty acid taurates, citrate esters, silicone copolymers, fatty acid polyglycol esters, fatty acid amides, fatty acid alkanolamides, quaternary ammonium compounds, alkylphenol ethoxylates, fatty amine ethoxylates.

Preference is given to using an anionic surfactant and/or a nonionic surfactant in the compositions according to the invention, where the anionic surfactant used is particularly preferably a fatty alcohol sulfate, fatty alcohol sulfonate, fatty alcohol ether sulfonate, alkanesulfonate and, in particular, a fatty alcohol ether sulfate, and the nonionic surfactant used is an alkyl and/or alkenyl polyglycoside.

A further preferred embodiment is an aqueous composition in the form of a pourable solution which comprises at least from 1 to 50% by weight, preferably from 10 to 40% by weight, in particular from 20 to 30% by weight, of at least one acylated polymeric polyamine. Preferably, this pourable solution has essentially no other surfactant addition. Where appropriate, this pourable solution can comprise up to 20% by weight, based on the total weight of the solution, of at least one of the cosolvents given below. If desired, the pH of the aqueous composition can be adjusted by adding a suitable acid, e. g. lactic acid or citric acid. Here, in some circumstances, it is possible for nonacylated amino groups to be converted into the corresponding salts.

For additional thickening, the compositions according to the invention can comprise a neutral salt, in particular sodium sulfate and preferably sodium chloride. The neutral salt is generally present in an amount of from 0.1 to 10% by weight, in particular from 0.5 to 6% by weight.

Moreover, the compositions according to the invention can comprise customary auxiliaries and additives known to the person skilled in the art, for example cosolvents such as alcohols, e. g. ethanol, isopropanol, ethylene glycol, propylene glycol, glycerol, lanolin derivative, cholesterol derivatives, isopropyl myristate, isopropyl palmitate, electrolytes, dyes, preservatives, acids (for example lactic acid, citric acid) etc. As mentioned above, in some circumstances salt formation occurs, depending on the pH of the composition.

In each case based on the total weight of the ingredients (excluding water), the compositions according to the invention generally comprise:
 from 0.2 to 50% by weight, preferably from 0.5 to 25% by weight, of at least one acylated polymeric polyamine according to the invention,
 from 50 to 99.8% by weight, preferably from 65 to 90.5% by weight, of at least one surfactant and
 from 0 to 50% by weight, preferably from 0.5 to 30% by weight, of at least one neutral salt,
the amounts totalling 100% by weight.

According to a preferred embodiment, the compositions according to the invention comprise (based on the total weight of the ingredients):
 a) from 10 to 90% by weight, preferably from 15 to 85% by weight, of at least one alkyl or alkenyl polyglycoside;
 b) from 0.2 to 50% by weight, preferably from 0.5 to 25% by weight, of at least one acylated polymeric polyamine;
 c) from 10 to 90% by weight, preferably from 15 to 85% by weight, of at least one anionic surfactant, in particular an alkyl ether sulfate, and
 d) from 0 to 50% by weight, preferably from 0.5 to 30% by weight, of at least one neutral salt,
the amounts totalling 100% by weight.

These compositions according to the invention are prepared in the customary manner, where the amides of the polymerized fatty acids can be used as such or as aqueous solution. The thickener is generally stirred into the aqueous composition. The thickener can be used without a diluent or in solution, preferably in aqueous solution.

The compositions according to the invention are, in particular, cosmetic compositions (shampoos), pharmaceutical compositions or dietetic compositions. The amides of the polymerized fatty acids can, however, also be used in industrial preparations, such as hydraulic fluids, cleaning preparations, crop-treatment compositions, printing inks, coating compositions and preparations for animal nutrition.

The invention relates to a method for increasing the viscosity of surfactant-containing compositions, where a thickening amount of at least one acylated polymeric polyamine according to the invention is added to a composition.

The examples below illustrate the invention without limiting it.

The abbreviation used in the examples has the following meaning: AV: acid value

EXAMPLE 1

1.5 g of 50% strength hypophosphorous acid and 237.5 g of isostearic acid (AV=189 mg of KOH/g) (Prisorine® 3501, Unichema) were added to 516 g of a polyethyleneimine having a number-average molecular weight ($M_w$) of about 25,000 at 70° C., and the mixture was stirred for 6.5 hours at 160° C. under a stream of nitrogen. The water of reaction which formed was distilled off. This gave 704 g of a polyethyleneimine acylated to 6.7 mol % with isostearic acid.

EXAMPLE 2

48.9 g of acetic acid were added to 76.0 g of the partially acylated polyethyleneimine from Example 1 at 160° C. over the course of 2 hours, and the mixture was stirred for a further 6.5 hours at 160° C. under a stream of nitrogen. The water of reaction which formed was distilled off. This gave 106 g of a polyethyleneimine acylated to 6.7 mol % with isostearic acid and overall to 65 mol %.

EXAMPLE 3

3.5 g of 50% strength hypophosphorous acid and 219 g of $C_{12}$–$C_{18}$-fatty acid (AV=256 mg of KOH/g) (Edenor® HK 12–18, Henkel) were added to 645 g of a polyethyleneimine having a number-average molecular weight ($M_w$) of about 25,000 at 70° C., and the mixture was stirred for 6 hours at 160° C. under a stream of nitrogen. The water of reaction which formed was distilled off. This gave 846 g of a polyethyleneimine acylated to 6.7 mol % with $C_{12}$–$C_{18}$-fatty acid.

EXAMPLE 4

131.0 g of acetic acid were added to 150.0 g of the partially acylated polyethyleneimine from Example 3 at 140° C. over the course of 1 hour, and the mixture was stirred for 4.5 hours at 160° C. under a stream of nitrogen. The water of reaction which formed was distilled off. This gave 236 g of a polyethyleneimine acylated to 6.7 mol % with $C_{12}$–$C_{18}$-fatty acid and overall to 69 mol %.

EXAMPLE 5

2.95 g of 50% strength hypophosphorous acid and 219 g of $C_{12}$–$C_{18}$-fatty acid (AV=256 mg of KOH/g) (Edenor® HK 12–18, Henkel) were added to 516 g of a polyethyleneimine having a number-average molecular weight ($M_w$) of about 25,000 at 70° C., and the mixture was stirred for 6 hours at 160° C. under $N_2$-protective gas. The water of reaction which formed was distilled off. This gave 717 g of a polyethyleneimine acylated to 8.3 mol % with $C_{12}$–$C_{18}$-fatty acid.

EXAMPLE 6

86.0 g of acetic acid were added to 100.0 g of the partially acylated polyethyleneimine from Example 3 at 140° C. over the course of 1 hour, and the mixture was stirred for 4.5 hours at 160° C. under a stream of nitrogen. The water of reaction which formed was distilled off. This gave 154 g of a polyethyleneimine acylated to 8.3 mol % with $C_{12}$–$C_{18}$-fatty acid and overall to 68 mol %.

EXAMPLE 7

66.7 g of formic acid were added to 100.0 g of the partially acylated polyethyleneimine from Example 1 at 140° C. over the course of 1 hour, and the mixture was stirred for a further 4.5 hours at 150° C. under a stream of nitrogen. The water of reaction which formed was distilled off. This gave 157 g of a polyethyleneimine acylated to 6.7 mol % with isostearic acid and overall to 67 mol %.

EXAMPLE 8

2.40 g of 50% strength hypophosphorous acid were added to 545 g of a 47% strength aqueous solution of a polyethyleneimine ($M_w$) of about 750 000). While distilling off the water, 50.4 g of isostearic acid (AV=189 mg of KOH/g) (Prisorine® 3501, Unichema) were added thereto at 140° C. The mixture was stirred for 6.5 hours at 160° C. under a stream of nitrogen. The water of reaction which formed was distilled off. This gave 310 g of a polyethyleneimine acylated to 3.3 mol % with isostearic acid.

EXAMPLE 9

72.0 g of acetic acid were added to 100.0 g of the partially acylated polyethyleneimine from Example 8 at from 140 to 160° C. over the course of 2 hours, and the mixture was stirred for a further 4.5 hours at 160° C. under a stream of nitrogen. The water of reaction which formed was distilled off. This gave 148 g of a polyethyleneimine acylated to 3.3 mol % with isostearic acid and overall to about 68 mol %.

EXAMPLE 10

3.97 g of 50% strength hypophosphorous acid and 219 g of $C_{12}$–$C_{18}$-fatty acid (AV=256 mg of KOH/g) (Edenor® HK 12–18, Henkel) were added to 774 g of a polyethyleneimine having a number-average molecular weight ($M_w$) of about 25,000 at 70° C., and the mixture was stirred for 6.5 hours at 160° C. under a stream of nitrogen. The water of reaction which formed was distilled off. This gave 973 g of a polyethyleneimine acylated to 5.6 mol % with $C_{12}$–$C_{18}$-fatty acid.

EXAMPLE 11

Formic Acid in Excess 84.9 g of formic acid were added to 100.0 g of the partially acylated polyethyleneimine from Example 10 at 140° C. over the course of 1 hour, and the mixture was stirred for 4.5 hours at 140° C. under a stream of nitrogen. The water of reaction which formed was distilled off. The temperature was then increased to 150° C. and excess formic acid was removed in the nitrogen stream. This gave 141 g of a polyethyleneimine acylated to 5.6 mol % with $C_{12}$–$C_{18}$-fatty acid and overall to about 73 mol %.

EXAMPLE 12

2.85 g of 50% strength hypophosphorous acid and 248 g of $C_{12}$–$C_{18}$-fatty acid (AV=271 mg of KOH/g) (Edenor® HK 12 70, Henkel) were added to 464 g of a polyethyleneimine having a number-average molecular weight ($M_w$) of about 25,000 at 70° C. and the mixture was stirred for 6.5 hours at 160° C. under a stream of nitrogen. The water of reaction which formed was distilled off. This gave 692 g of a polyethyleneimine acylated to 11 mol % with $C_{12}$–$C_{18}$-fatty acid.

EXAMPLE 13

47.9 g of formic acid were added to 100.0 g of the partially acylated polyethyleneimine from Example 12 at 140° C. over the course of 1 hour, and the mixture was stirred for 4.5 hours at 150° C. under a stream of nitrogen.

The water of reaction which formed was distilled off. This gave 120 g of a polyethyleneimine acylated to 11 mol % with $C_{12}$–$C_{18}$-fatty acid and overall to about 58 mol %.

EXAMPLE 14

The following composition was prepared:

| | |
|---|---:|
| Plantaren ® 2000 from Henkel ($C_8$–$C_{16}$-alkyl polyglycoside; 50% strength) | 160 g |
| Texapon ® NSO from Henkel (Sodium lauryl ether sulfate; 28% strength) | 220 g |
| Demineralized water | 610 g |

The pH of the composition was adjusted to 5.5 by adding citric acid. 3% by weight of sodium chloride, based on the total weight of the composition, were then added. The resulting composition then had a viscosity of 12.5 mPas. In each case 2% by weight of an acylated polymeric polyamine were then stirred into equal parts of this composition and the viscosity was determined. The viscosity measurements were made using a HAAKE VT 500 instrument, measuring device PK5-1°; temperature 20°; shear rate 30 $s^{-1}$. The resulting viscosities (in mPas) are given in the table below.

| Acylated polyamine | 0% | 2,0 % |
|---|---|---|
| Example 2 | 12,5 | 3930 |
| Example 4 | 12.5 | 4130 |
| Example 6 | 12.5 | 4020 |
| Example 7 | 12.5 | 3260 |
| Example 9 | 12.5 | 3570 |
| Example 11 | 12.5 | 5400 |
| Example 13 | 12.5 | 5590 |

183/iT

We claim:

1. A method of increasing the viscosity of surfactant-containing compositions, where a thickening amount of at least one acylated polymeric polyamide is added to the composition, where a) some of the polyamine nitrogen atoms of the acylated polymeric polyamine carry acyl radicals of the formula I

   $$R^1\text{—C—} \qquad (I)$$

in which
   $R^1$ is selected from $C_7$- to $C_{27}$-alkyl, $C_7$- to $C_{27}$-alkenyl and $C_7$- to $C_{27}$-hydroxyalkyl, and b) some of the polyamine nitrogen atoms of the acylated polymeric polyamine carry acyl radicals of the formula II

   $$R^2\text{—C—} \qquad (II)$$

in which
   $R^2$ is selected from hydrogen, $C_1$- to $C_6$-alkyl and $C_1$- to $C_6$-hydroxyalkyl where from 0.3 to 15% of the polyamide nitrogen atoms have an acyl radical of the formula I.

2. The method as claimed in claim 1, where $R^1$ in formula I is a $C_7$- to $C_{27}$-alkyl radical or a $C_7$- to $C_{27}$-alkenyl radical and $R^2$ in formula II is hydrogen or a $C_1$ to $C_6$-alkyl radical.

3. The method as claimed in claim 1, where the radicals of $R^1$ and $R^2$ have a difference in the number of carbon atoms of at least 4.

4. The method as claimed in claim 1, where from 5 to 100% of the polyamide nitrogen atoms have been acylated.

5. A method of increasing the viscosity of surfactant-containing aqueous compositions, where at least one acylated polymeric polyamine, as defined in claim 1, is added to a composition, further comprising:

a) at least one alkyl or alkenyl polyglycoside,
   b) optionally at least one other surfactant different from a), and
   c) optionally at least one neutral salt.

6. The method as claimed in claim 5, wherein the composition comprises from 0.1 to 20% by weight of at least one acylated polymeric polyamine.

7. The method as claimed in claim 5, wherein the composition is a cosmetic composition.

* * * * *

UNITED STATES PATENT AND TRADEMARK OFFICE
CERTIFICATE OF CORRECTION

PATENT NO. : 6,579,846 B1 Page 1 of 1
DATED : June 17, 2003
INVENTOR(S) : Zirnstein et al.

It is certified that error appears in the above-identified patent and that said Letters Patent is hereby corrected as shown below:

Column 12,
Line 5, formula (I) should be -- $R^1$ -CO- --;
Line 15, formula (II) should be -- $R^2$-CO- --.

Signed and Sealed this

Twentieth Day of January, 2004

JON W. DUDAS
*Acting Director of the United States Patent and Trademark Office*